US010787282B2

(12) United States Patent
Takemura

(10) Patent No.: US 10,787,282 B2
(45) Date of Patent: Sep. 29, 2020

(54) CAP AND CAP UNIT

(71) Applicant: MAX CO., LTD., Tokyo (JP)

(72) Inventor: Hajime Takemura, Tokyo (JP)

(73) Assignee: MAX CO., LTD., Tokyo (JP)

( * ) Notice: Subject to any disclaimer, the term of this patent is extended or adjusted under 35 U.S.C. 154(b) by 330 days.

(21) Appl. No.: 15/726,465

(22) Filed: Oct. 6, 2017

(65) Prior Publication Data

US 2018/0099768 A1 Apr. 12, 2018

(30) Foreign Application Priority Data

Oct. 11, 2016 (JP) .................................. 2016-200412

(51) Int. Cl.
| | |
|---|---|
| *B65B 13/18* | (2006.01) |
| *A01G 17/08* | (2006.01) |
| *B65B 13/34* | (2006.01) |
| *B26D 1/00* | (2006.01) |

(52) U.S. Cl.
CPC ............ B65B 13/183 (2013.01); A01G 17/08 (2013.01); A01G 17/085 (2013.01); B65B 13/345 (2013.01); *B26D 2001/0053* (2013.01)

(58) Field of Classification Search
CPC ..... B65B 13/183; B65B 13/345; A01G 17/08; A01G 17/085; B26D 2001/0053; A01B 1/22; B65D 83/10
USPC .................. 227/120; 83/701; 30/78, 84, 335
See application file for complete search history.

(56) References Cited

U.S. PATENT DOCUMENTS

| | | | | |
|---|---|---|---|---|
| 2,285,155 | A * | 6/1942 | Frost ....................... | B26B 5/006 30/162 |
| D136,086 | S * | 8/1943 | Hudson ....................... | D30/158 |
| 2,597,540 | A * | 5/1952 | Smith ....................... | B26B 5/00 30/156 |
| 2,800,713 | A * | 7/1957 | Roth ....................... | B26B 21/24 30/51 |
| 3,007,244 | A * | 11/1961 | Vern ....................... | B26B 5/006 30/162 |
| 3,219,180 | A * | 11/1965 | Rosen .................... | B65D 83/10 30/34.2 |
| 3,373,862 | A * | 3/1968 | Doreen .................. | B65D 83/10 206/357 |
| 3,943,627 | A * | 3/1976 | Stanley, Jr. ............. | B26B 29/02 30/151 |

(Continued)

FOREIGN PATENT DOCUMENTS

| | | |
|---|---|---|
| CN | 201742766 U | 2/2011 |
| CN | 202354128 U | 8/2012 |

(Continued)

OTHER PUBLICATIONS

Kim-Christian Meyer, "Die perfekte Rasur-Nicht in Seattle", Jun. 30, 2013, XP055450177, Berlin Retrieved from the Internet: URL:http://nichtinseattle.de/die-perfekte-rasur/.

(Continued)

*Primary Examiner* — Dariush Seif
(74) *Attorney, Agent, or Firm* — Rothwell, Figg, Ernst & Manbeck, P.C.

(57) ABSTRACT

A cap is to be removably attached to a cutting blade configured to cut a tape. The cap includes a grip portion to be gripped by a user and a holding portion configured to hold teeth provided on a distal end of the cutting blade while causing the teeth to face the grip portion.

17 Claims, 19 Drawing Sheets

(56) References Cited

U.S. PATENT DOCUMENTS

| | | | | |
|---|---|---|---|---|
| 4,757,612 | A * | 7/1988 | Peyrot | B26B 29/02 30/151 |
| 4,989,769 | A * | 2/1991 | Longworth | B26D 7/22 156/527 |
| 5,325,596 | A * | 7/1994 | Baker | B26B 27/007 2/163 |
| 5,357,680 | A * | 10/1994 | Monistere | B26B 21/525 30/298 |
| 5,588,212 | A * | 12/1996 | Riihimaki | B60R 22/32 30/123 |
| 5,673,711 | A * | 10/1997 | Andrews | A45D 24/36 132/148 |
| 5,908,036 | A * | 6/1999 | Andrews | A45D 24/36 132/215 |
| 5,934,291 | A * | 8/1999 | Andrews | A45D 24/36 132/215 |
| 9,975,234 | B2 * | 5/2018 | Berman | B25G 1/063 |
| D832,066 | S * | 10/2018 | Takemura | D8/13 |
| 2004/0069666 | A1 * | 4/2004 | Zieger | A45D 27/225 206/356 |
| 2004/0237805 | A1 | 12/2004 | Hayashi et al. | |
| 2011/0308090 | A1 * | 12/2011 | Ho | B26B 5/003 30/152 |
| 2017/0043989 | A1 * | 2/2017 | Kwak | B26B 11/00 |

FOREIGN PATENT DOCUMENTS

| | | |
|---|---|---|
| CN | 103433956 A | 12/2013 |
| CN | 105072946 A | 11/2015 |
| FR | A7-2208277 | 6/1974 |
| JP | 09056944 A | 3/1997 |
| JP | 2003-341613 A | 12/2003 |
| JP | 2004222520 A | 8/2004 |
| JP | 4081668 B2 | 2/2008 |
| WO | 2008018507 A1 | 2/2008 |

OTHER PUBLICATIONS

Extended European Search Report dated Feb. 21, 2018 in corresponding European patent application 17195385.4 (9 pages).
European Office Action issued in Application No. 17 195 385.4, dated Dec. 10, 2019, 7 pages.
Kim-Christian Meyer. "Die perfekte Rasur—Nicht in Seattle," Jun. 30, 2013, XP055450177, retrieved from the internet: URL:http://nichtinseattle.de/die-perfekte-rasur/ [retrieved on Feb. 12, 2018], 1 page.
Office Action issued for corresponding Chinese Application No. 201710941352.0 dated Mar. 25, 2020 (6 pages).
Office Action issued for corresponding Taiwanese Application No. 106134514 dated Mar. 24, 2020 (7 pages).

* cited by examiner

CAP AND CAP UNIT

CROSS-REFERENCE TO RELATED APPLICATION

This application claims priority from Japanese Patent Application No. 2016-200412 filed on Oct. 11, 2016, the entire contents of which are incorporated herein by reference.

TECHNICAL FIELD

The present invention relates to a cap and a cap unit.

BACKGROUND

Conventionally, when a vine or branch of a fruit tree, a vegetable or the like is bound to a support, or vegetables or bags are bundled with each other, binding machines for gardening are widely used. In the binding machines for gardening, a binding process is performed by a series of steps as follows. First, a tape is pulled out from a binder main body by an opening and closing operation of a clincher arm, so that the tape is stretched between distal ends of the clincher arm and the binder main body. Then, in this state, the binder main body is reached out forward, so that the tape is wrapped around an object to be bounded. Then, the clincher arm is again closed, so that the tape is bounded by a staple and also the tape is cut by a cutting blade.

For example, in JP 2003-341613 (A), a binding machine for gardening is disclosed, in which a cutting blade having a notched blade shape is attached to a distal end of a driver handle (binder main body). In general, the cutting blade is sandwiched between a leaf spring provided in the driver handle and a sheet metal and thus is held on the driver handle. The cutting blade is properly replaced by a user, such as when the cutting blade becomes impossible to cut a tape due to an endurance limit (aged deterioration). When replacing the cutting blade, the user removes a cutting blade to be replaced form the binder main body while gripping the cutting blade with a pliers or the like, and then attaches a new cutting blade to a loading location on the binder main body while gripping the cutting blade with the pliers.

However, the binding machine for gardening described in JP 2003-341613 (A) and the like have the following problems. That is, as described above, when replacing the cutting blade, the user grips the cutting blade with the pliers and the like, but it is difficult to stabilize a posture of the cutting blade with respect to the pliers and the like. Therefore, there is a problem that the cutting blade cannot be precisely mounted in a loading location on the binder main body. Also, when the cutting blade is gripped with a needle nose pliers, a sufficient force is not transferred to the cutting blade. Therefore, there is a problem that the cutting blade cannot be sufficiently pushed into the loading location. On the other hand, if attempting to reliably push the cutting blade into the loading location, a tooth tip of the cutting blade is pressed by an excess pressing force. Therefore, there is a possibility that occurrence of breakage of the tip (blade chipping) is caused.

SUMMARY

Accordingly, the present invention has been made keeping in mind the above problems, and an object thereof is to provide a cap and a cap unit, in which it is possible to precisely and easily replace a cutting blade.

A cap of the present invention may be removably attached to a cutting blade configured to cut a tape. The cap may include a grip portion to be gripped by a user and a holding portion configured to hold teeth provided on a distal end of the cutting blade while causing the teeth to face the grip portion.

A cap unit of the present invention may include a cutting blade configured to cut a tape and a cap to be removably attached to the cutting blade. The cap includes a grip portion to be gripped by a user and a holding portion configured to hold teeth provided on a distal end of the cutting blade while causing the teeth to face the grip portion.

According to the present invention, the cutting blade is held by the cap. Therefore, during replacing of the cutting blade, it is possible to stabilize a posture of the cutting blade and also to prevent the teeth from coming in contact with parts of a binding machine for gardening.

DETAILED DESCRIPTION

Hereinafter, preferable embodiments of the present invention will be described in detail with reference to the accompanying drawings.

Configuration Example of Binding Machine for Gardening 100

Figure 1:
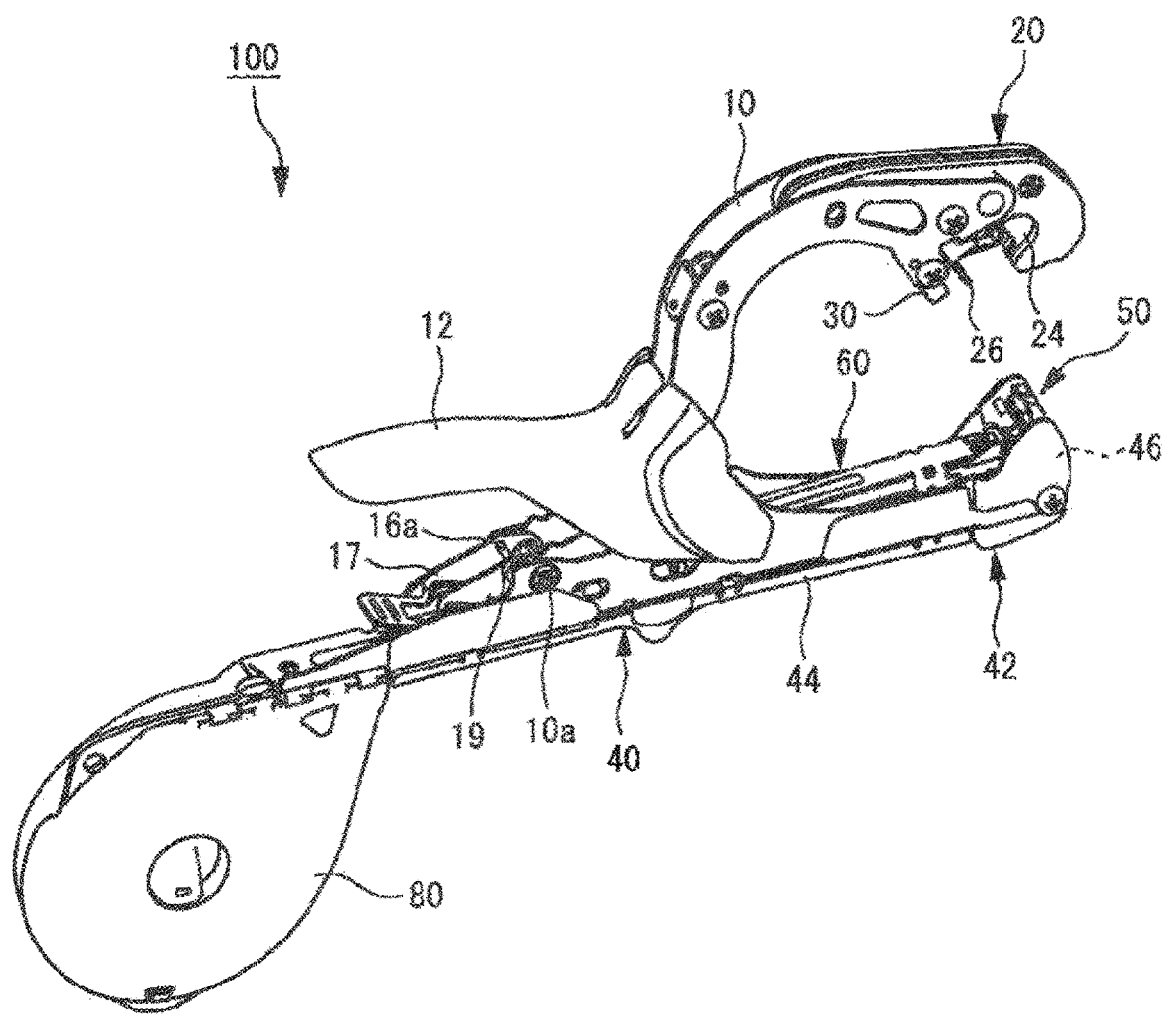
FIG. 1 is a perspective view showing a configuration example of a binding machine for gardening according to one embodiment of the present invention.
Figure 2:
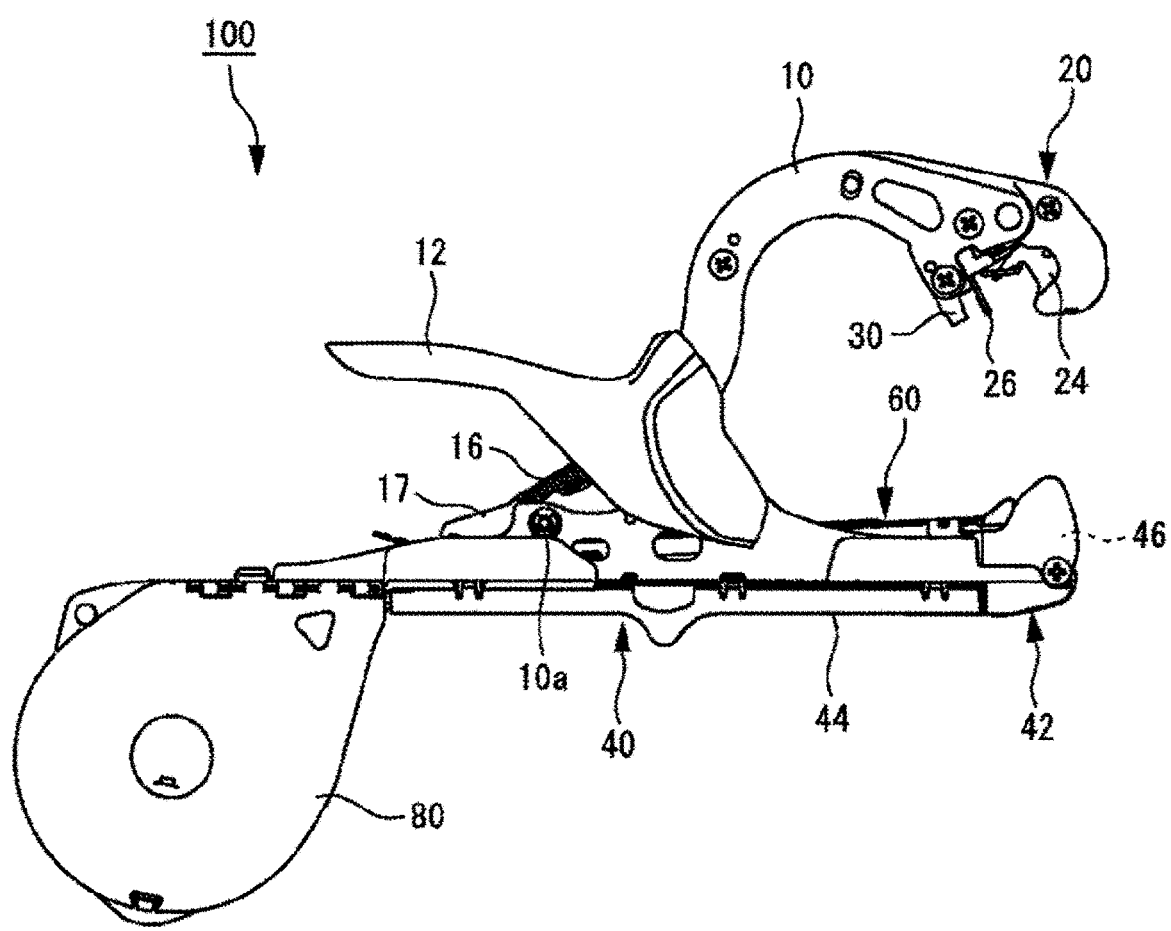
FIG. 2 is a first front view showing the configuration example of the binding machine for gardening.
Figure 3:
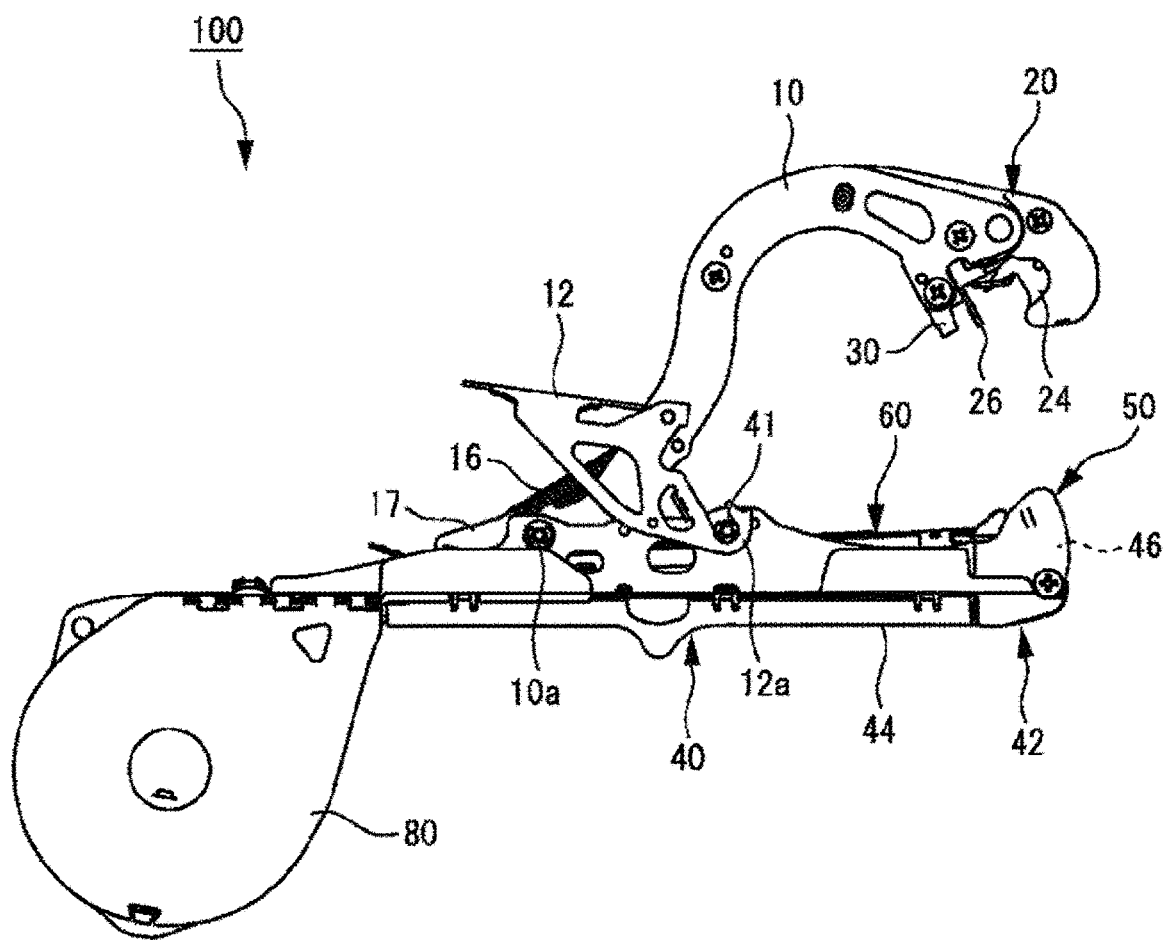
FIG. 3 is a second front view showing the configuration example of the binding machine for gardening.
Figure 4:
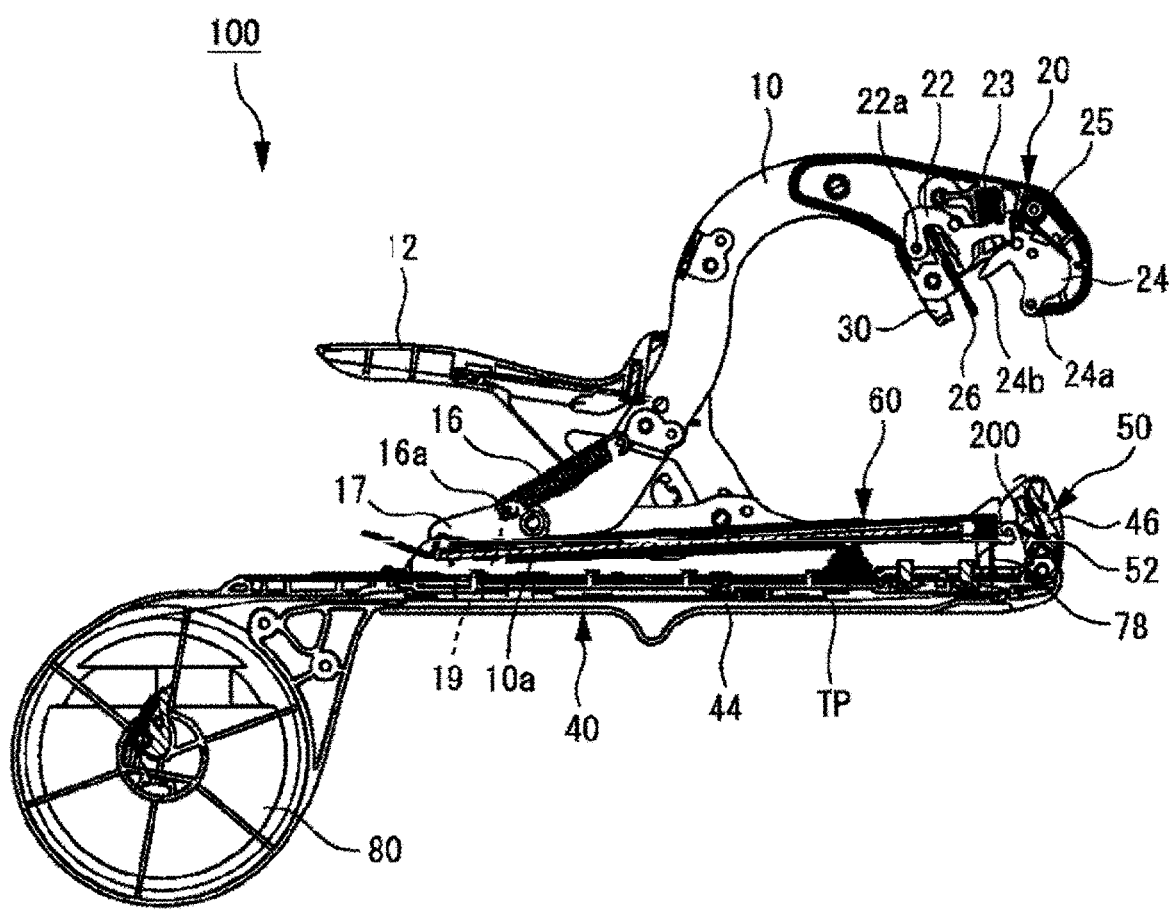
FIG. 4 is a sectional view showing the configuration example of the binding machine for gardening.

FIG. 1 is a perspective view showing an example of a configuration of a binding machine for gardening 100 according to a first embodiment, FIGS. 2 and 3 are front views thereof, and FIG. 4 is a sectional view thereof. In FIGS. 1 to 4, a right side of the paper surface is referred to as a front side of the binding machine for gardening 100 and a left side of the paper surface is referred to as a rear side of the binding machine for gardening 100.

As shown in FIGS. 1 to 4, the binding machine for gardening 100 as a hand-held tool includes a clincher arm 10, a binder main body 40, a handle 12, a tape pull-out unit 20, a tape conveying unit 42, a tape cutting unit 50, a staple magazine unit 60 and a tape magazine unit 80.

A base end of the clincher arm 10 is pivotally attached to a shaft portion 10a provided on a plate-shaped member 17 of the binder main body 40 and also is urged rearward by a tension spring 16. One end part of the tension spring 16 is attached to a portion of the clincher arm 10 which is located slightly below substantially the middle thereof, and the other end part of the tension spring 16 is attached to a shaft portion 16a provided on the plate-shaped member 17. The shaft portion 16a is arranged on a portion of the plate-shape member 17 which is located slightly more rearward than the shaft portion 10a.

A rear end side of the handle 12 is configured as a grip portion to be gripped by a user. A middle part of the handle 12 is pivotally attached to the clincher arm 10 at substantially. A hook 12a is provided on a front end side of the handle 12. The hook 12a is hooked on an attaching portion 41 provided on the binder main body 40. According to this configuration, the clincher arm 10 can be opened or closed relative to the binder main body 40 in accordance with an operation of opening or closing the handle 12, due to the principle of the leverage of the handle 12. Additionally, by releasing engagement of the hook 12a with the attaching portion 41, it is possible to largely open the clincher arm 10 relative to the binder main body 40. By having such a function, binding of a bound article 500 having a large diameter is allowed.

The tape pull-out unit 20 is a mechanism configured to pull out a tape TP from the binder main body 40 and is provided on a distal end of the clincher arm 10. The tape pull-out unit 20 has a lock plate 22, a tape catch 24 and a tape plate 26.

The lock plate 22 is configured to be pivotable about a shaft portion 22a as a fulcrum provided on one end side thereof. The other end side of the lock plate 22 is urged toward the tape catch 24 by a coil spring 23. When being urged by the coil spring 23, the lock plate 22 is engaged with the tape catch 24, thereby locking the tape catch 24 and thus fixing the tape catch 24 at a location spaced from the tape plate 26.

The tape catch 24 is provided to be pivotable about a shaft portion 24a as a fulcrum and is urged toward the tape plate 26 by a torsion coil spring 25. If locking of the tape catch 24 by the locking plate 22 is released during pulling out of the tape, a tapered-shaped distal end portion 24b of the tape catch 24 is moved toward the tape plate 26 due to urging by the torsion coil spring 25.

The tape plate 26 is arranged to be opposed to the tape catch 24 and has a distal end extending from the lock plate 22 toward the binder main body 40. The tape plate 26 is configured to sandwich the tape VP between the extending portion thereof and the tape catch 24 and also to pull the tape TP upward from a tape guide 46 in accordance with a return (opening) operation of the clincher arm 10.

The tape conveying unit 42 has a tape holder 44 and the tape guide 46. The tape holder 44 is a path for conveying the tape from the tape magazine unit 80 to the tape guide 46 and is provided along a longitudinal direction of the binder main body 40. Also, the tape holder 44 is configured to be capable of opening and closing about one side thereof in the longitudinal direction as a fulcrum, thereby facilitating an operation of setting the tape IP therein. The tape guide 46 is pivotally provided on a front end of the binder main body 40 (tape holder 44) and is configured to maintain the tape with a leading end thereof pulled upward from the tape guide 46.

The tape cutting unit 50 has a cutting blade 200 for cutting the tape TP and a lock mechanism 52 for locking and unlocking the cutting blade 200 with respect to the tape guide 46. The cutting blade 200 is configured to be fixed at a predetermined location on the tape guide 46 by the lock mechanism 52 and also to be removable from the tape guide 46 by releasing of the lock mechanism 52. Meanwhile, the configuration or function of the tape cutting unit 50 will be described below.

The staple magazine unit 60 is attached on an upper surface side of the binder main body 40, and staples, which are bonded and connected to each other, are loaded therein. The staple magazine unit 60 is configured to drive a staple into an overlapping portion of the tape TP in accordance with the opening and closing operation of the clincher arm 10, thereby binding the overlapping portion of the tape TP.

The tape magazine unit 80 is attached to a rear end of the binder main body 40 and receives a tape roll, which is formed by rolling the tape TP. The tape magazine unit 80 is configured to rotate in a forward direction by an operation of pulling out the tape TP based on the opening and closing operation of the clincher arm 10, thereby sending the tape TP to the tape conveying unit 42.

Herein, when the binding machine for gardening 100 as shown in FIGS. 1 to 3 is accidently dropped during use thereof, there is a possibility that the hook 12a of the handle 12 is separated from the attaching portion 41 of the binder main body 40 and thus the clincher arm 10 is pivoted rearward and largely opened, depending on how the binding machine for gardening 100 is dropped. In this way, when the hook 12a is unintentionally separated and thus the clincher arm 10 is opened, the clincher arm 10 strongly collides with a stopper member for restricting a degree of opening of the clincher arm 10. In the present embodiment, the degree of opening is restricted when the base end of the clincher arm 10 comes in contact with the shaft portion 16a provided on the rear thereof. Therefore, the shaft portion 16a or the plate-shaped member 17 is deformed due to collision between the clincher arm 10 and the shaft portion 16a. As a result, there is a problem that a lid of the staple magazine unit 60 is not opened and thus replacement of the staples is impossible.

Accordingly, in the present embodiment, elastic components 19 constructed by an elastic member such as an O-ring are mounted on locations, which are respectively located on both ends of the shaft portion 16*a* and are to collide with the base end of the clincher arm 10. Therefore, even if the clincher arm 10 is largely opened, the base end of the clincher arm 10 collides with the elastic components 19, thereby relieving (absorbing) an impact upon opening of the clincher arm 10 by the elastic components 19. As a result, it is possible to prevent an impact of the clincher arm 10 from being directly transferred to the shaft portion 16*a*, thereby preventing deformation of the staple magazine unit 60 and thus allowing staples to be smoothly replaced.

Operation Example of Binding Machine for Gardening 100

Figure 5:
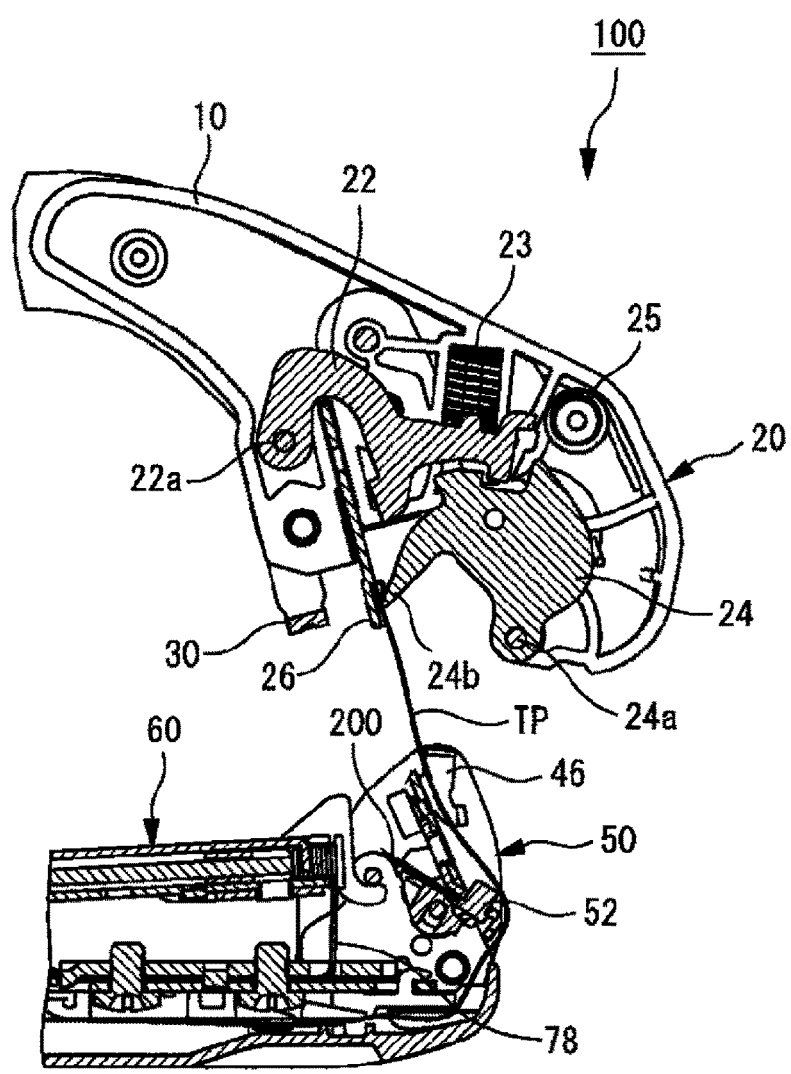
FIG. 5 is a sectional view showing the binding machine for gardening in a state where a tape is being pulled out.
Figure 6:
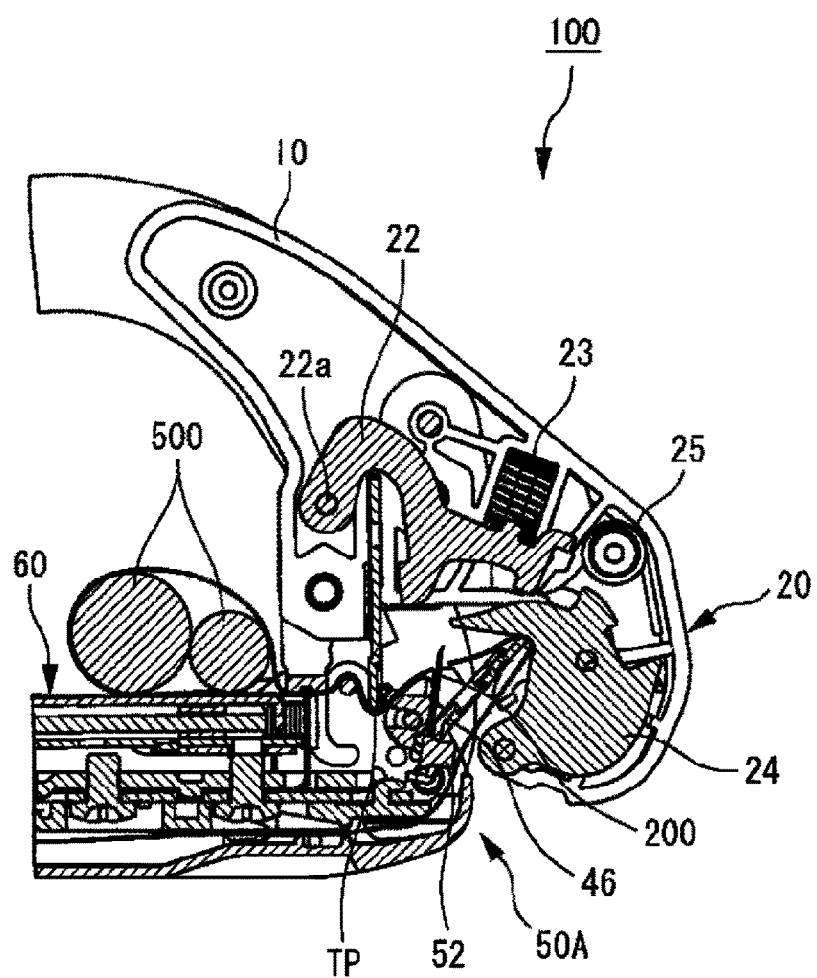
FIG. 6 is a sectional view showing the binding machine for gardening in a state where the tape is being cut off.

Next, an example of an operation of the binding machine for gardening 100 according to the present invention during a binding process will be described. FIG. 5 is a sectional view showing the binding machine for gardening 100 in a state where the tape TP is being pulled out. FIG. 6 is a sectional view showing the binding machine for gardening 100 in a state where the tape TP is being cut off.

Referring to FIGS. 1 to 6, if the handle 12 is gripped by a user, the clincher arm 10 is moved (lowered) in a direction approaching the binder main body 40. Therefore, the lock plate 22 is abutted against the tape guide 46 of the binder main body 40, and thus the lock plate 22 is pushed upward so that locking of the tape catch 24 by the lock plate 22 is released.

If locking of the tape catch 24 is released, the tape catch 24 is pivoted toward the tape plate 26, and thus the tape TP is pressed against the tape guide 46 by the distal end portion 24*b* of the tape catch 24.

Subsequently, if gripping of the handle 12 by the user is released, the clincher arm 10 is moved (lifted) in a direction away from the binder main body 40. Accordingly, as shown in FIG. 5, the tape catch 24 is transferred from the tape guide 46 to the tape plate 26, and thus the tape TP is pulled upward from the tape guide 46 while being sandwiched between the tape plate 26 and the tape catch 24. Also, as the clincher arm 10 is lifted, the lock plate 22 and the tape catch 24 are engaged with each other.

Subsequently, as the binder main body 40 is reached out forward, the tape TP is pressed against a branch of a vegetable and the like or a support (hereinafter, the branch and the support are collectively referred to as a bound article 500), and thus the bound article 500 is taken in the clincher arm 10.

Subsequently, if the handle 12 is again strongly gripped by the user, the clincher arm 10 is moved (lowered) in the direction approaching the binder main body 40, and thus the tape TP is wrapped around the bound article 500.

As the clincher arm 10 is lowered, the tape guide 46 is moved along opposing inclined surfaces of the tape catch 24, and then if the tape guide 46 reaches a location at which movement thereof is limited, the tape catch 24 is pivoted in a direction away from the tape plate 26 (toward the front side). Accordingly, the tape guide 46 is also pivoted toward the front side.

As the tape guide 46 is pivoted, as shown in FIG. 6, the cutting blade 200 is also pivoted so that teeth, which are provided on a distal end thereof, pierce through the tape TP, thereby cutting the tape TP. Also, a clincher 30 presses a staple magazine main body 62, and thus the staple magazine main body 62 is tilted about a rear end thereof as a fulcrum. As a result, a staple is pushed out though an exit portion by a driver 78 and thus an overlapping portion of the tape TP is bound by the staple. In the present embodiment, an operation of binding the bound article 500 is performed by such a series of steps.

Configuration Example of Tape Cutting Unit 50

Figure 7:
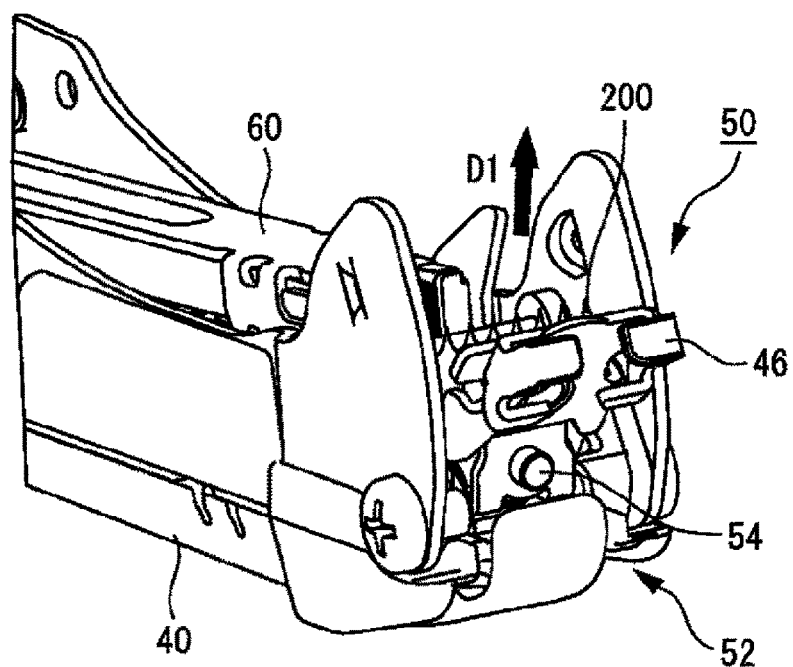
FIG. 7 is a perspective view showing a configuration example of a tape cutting unit.
Figure 8:
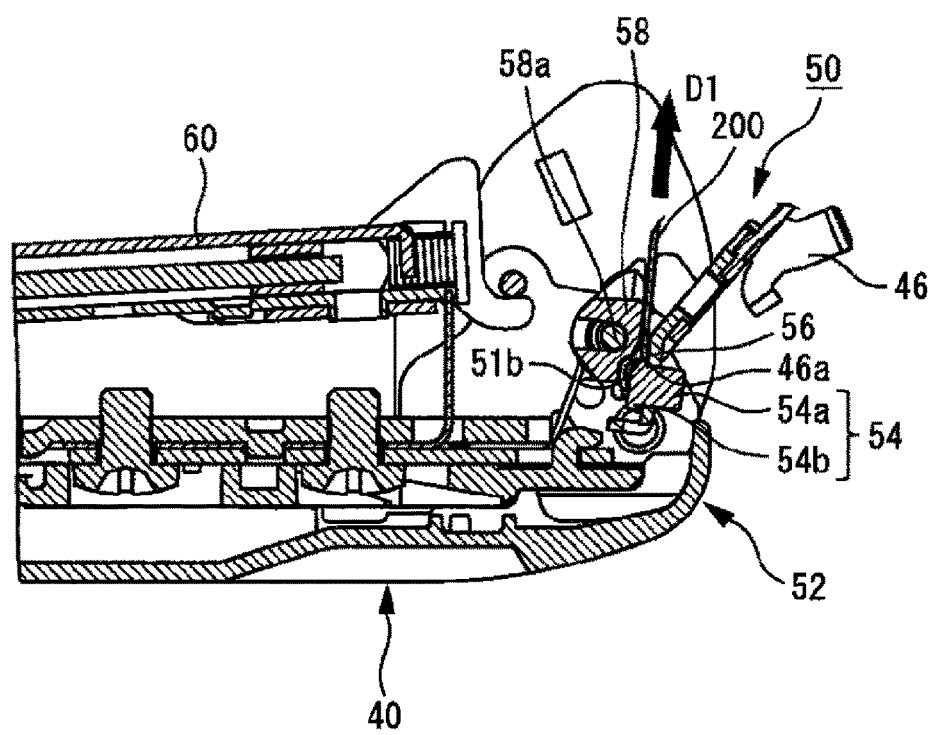
FIG. 8 is a sectional view showing the configuration example of the tape cutting unit.

Next, the tape cutting unit 50 will be described. FIG. 7 is a perspective view showing an example of a configuration of the tape cutting unit 50 and FIG. 8 is a sectional view thereof. As shown in FIGS. 7 and 8, the tape cutting unit 50 has the cutting blade 200 and the lock mechanism 52.

First, the lock mechanism 52 will be described. The lock mechanism 52 is a mechanism configured to lock the cutting blade 200 at a predetermined location on the tape guide 46 or to unlock the cutting blade 200. The lock mechanism 52 has a release button 54, a coil spring 56 and a guide member 58.

Figure 9A:
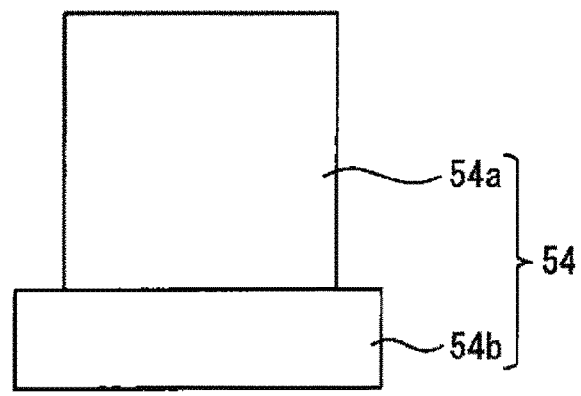
FIG. 9A is a front view showing a configuration example of a release button and FIG. 9B is a sectional view thereof.
Figure 9B:
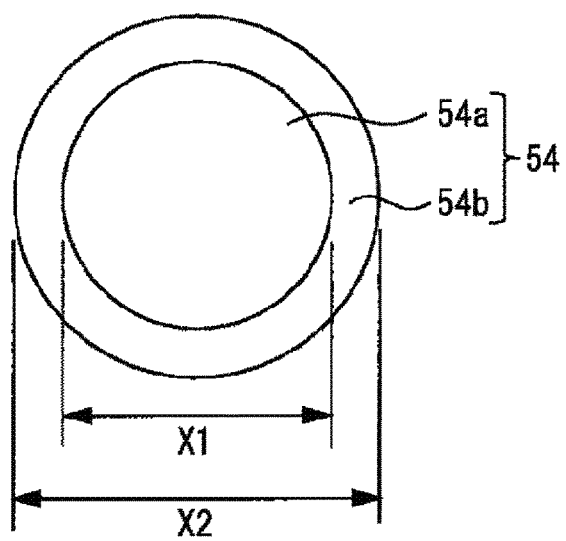

The release button 54 is arranged on a front surface portion of the tape guide 46, but at a location where the release button 54 does not overlap with an extracting direction D1 of the cutting blade 200 (location shifted therefrom) (see FIGS. 7 and 8). FIG. 9A is a front view showing an example of a configuration of the release button 54 and FIG. 9B is a plan view thereof. As shown in FIGS. 7, 8, 9A and 9B, the release button 54 is a cylindrical body 54*a* and an enlarged diameter portion 54*b* integrally formed with a rear end (base end) of the cylindrical body 54*a* and having a diameter X2 larger than a diameter X1 of the cylindrical body 54*a*. The cylindrical body 54*a* of the release button 54 is provided to protrude forward through a through-hole 46*a* formed in the tape guide 46, and the enlarged diameter portion 54*b* of the release button 54 is locked by an opening peripheral edge portion of the through-hole 46*a*. Therefore, the release button 54 is prevented from falling out forward from the tape guide 46.

The guide member 58 is a member intended to assist in attaching the cutting blade 200 and is attached to a portion of the binder main body 40 which is located on the rear of the cutting blade 200. Also, a shaft portion 58*a* extending in a transversal direction of the binder main body 40 is provided adjacent to the guide member 58. The coil spring 56 is mounted on the shaft portion 58*a*.

The coil spring 56 is constructed by a so-called double torsion spring in which two torsion springs are connected with each other. The coil spring 56 is configured to be abutted against the enlarged diameter portion 54*b* of the release button 54 and thus to urge the release button 54 forward, thereby elastically supporting the release button 54 while forcing the release button 54 to protrude forward through the tape guide 46. Meanwhile, although in the present embodiment, the coil spring 56 is employed as an urging means for the release button 54, the present invention is not limited thereto, but an elastic member such as a leaf spring or a compression spring may be employed.

Figure 10A:
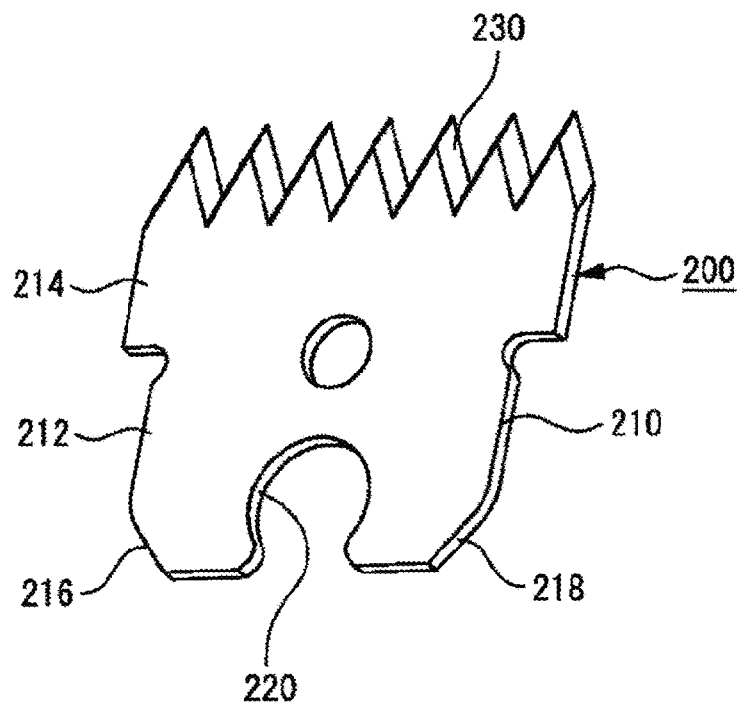
FIG. 10A is a perspective view showing a configuration example of a cutting blade and FIG. 10B is a plan view thereof.
Figure 10B:
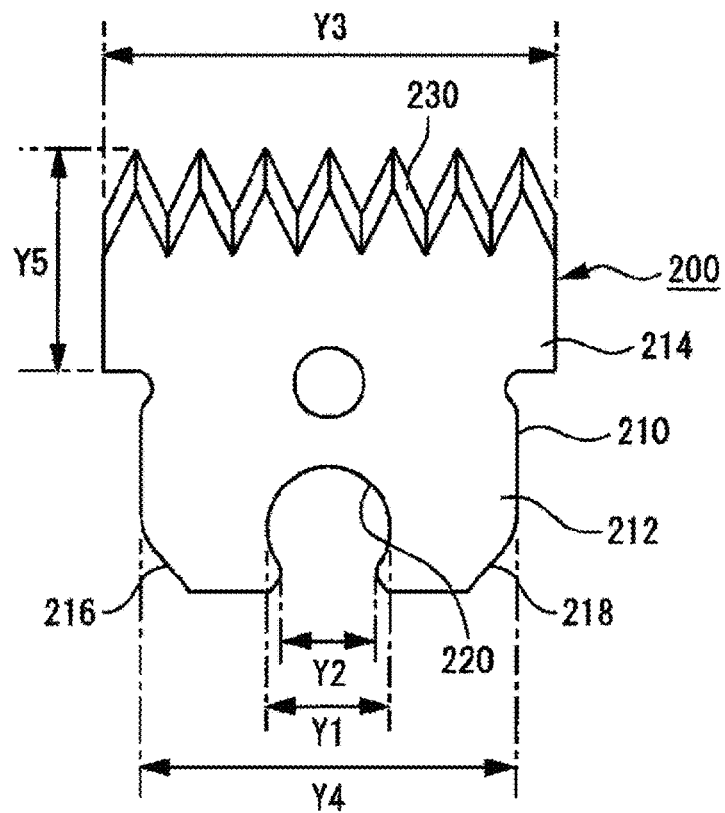

Next, the cutting blade 200 will be described. FIG. 10A is a perspective view showing an example of a configuration of the cutting blade 200 and FIG. 10B is a plan view thereof. As shown in FIGS. 10A and 10B, the cutting blade 200 has a main body 210 having a generally rectangular shape as viewed in a plan view, a recess 220 provided in a base end of the main body 210, and sawtooth-shaped teeth 230 provided on a distal end of the main body (as shown in FIGS. 10A and 10B, the cutting edge having teeth 230 is on an opposite end of the blade than the recess 220, with the cutting edge provided on the distal end of the cutting blade 200). The recess 220 is formed to be cut out in a generally circular shape corresponding to a shape of the release button 54. A width Y1 of the recess 220 is selected to have substantially the same length as the diameter X2 of the enlarged diameter portion 54b of the release button 54. A width Y2 of the recess 220 is selected to be larger than the diameter X1 of the cylindrical body 54a of the release button 54. Also, the base end of the main body 210 is configured such that a lower portion than the vicinity of the middle thereof is formed to have a narrower width (hereinafter, referred to as a narrower portion 212) and an upper portion is formed to have a wider width (hereinafter, referred to as a wider portion 214). A dimension of the narrower portion 212 in a width direction thereof is a width Y4, and a dimension of the wider portion 214 in a width direction thereof is a width Y3 wider than the width Y4. Also, a dimension of the wider portion 214 in a length direction thereof, which ranges from a tooth tip to a lower end of the wider portion, is a length Y5. When the cutting blade 200 is attached such that a lower surface of the wider surface 214 is in contact with the main body, it is possible to maintain an amount of protrusion of the cutting blade 200 constant. Also, tapered surfaces 216, 218 for picking-up are respectively formed on both sides of a lower end of the main body 210, thereby facilitating attaching the cutting blade 200 to the binder main body 40.

Configuration Example of Cap 300

Figure 11:
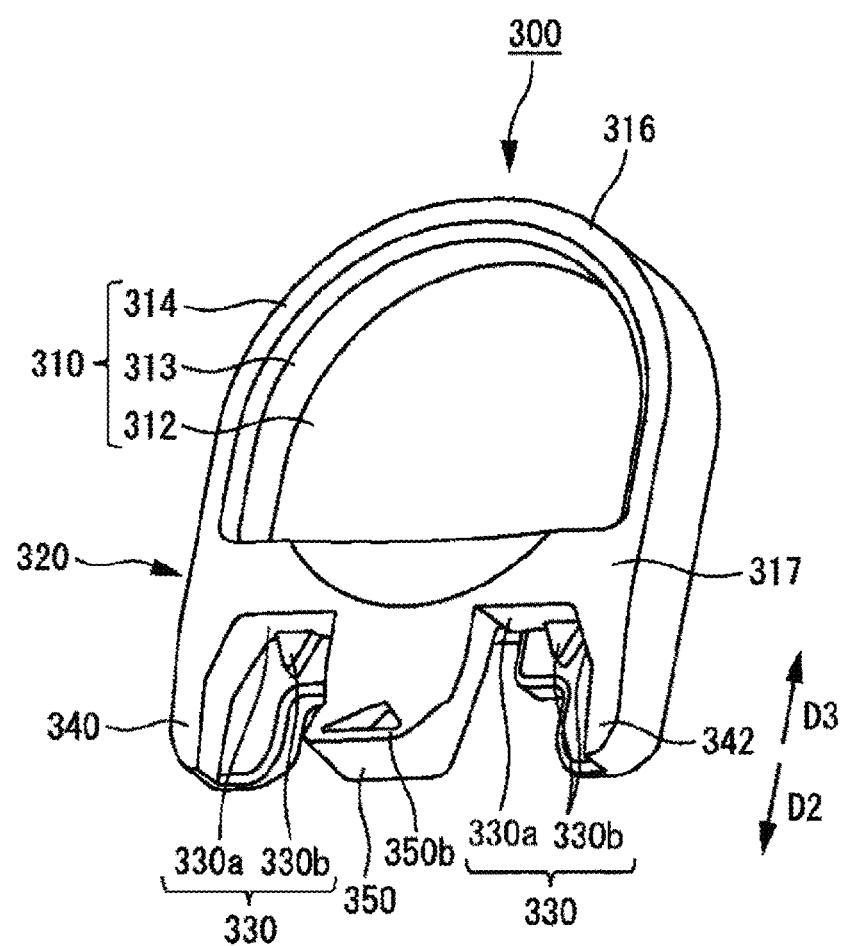
FIG. 11 is a perspective view showing a configuration example of a cap.
Figure 12A:
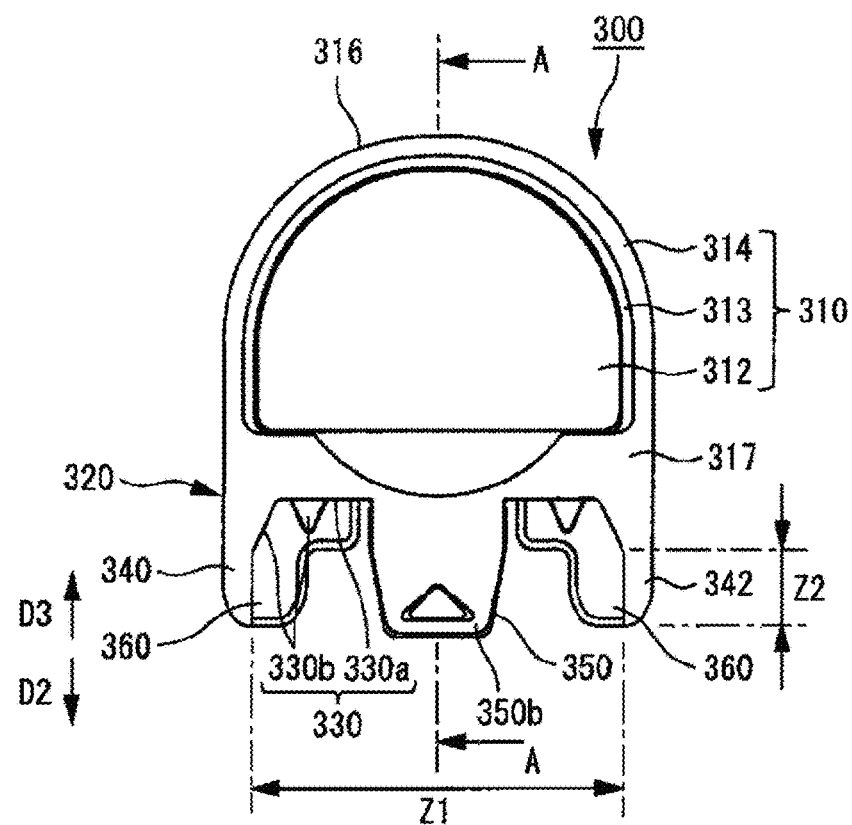
FIG. 12A is a plan view showing the configuration example of the cap and FIG. 12B is a sectional view taken along a line A-A in FIG. 12A.
Figure 12B:
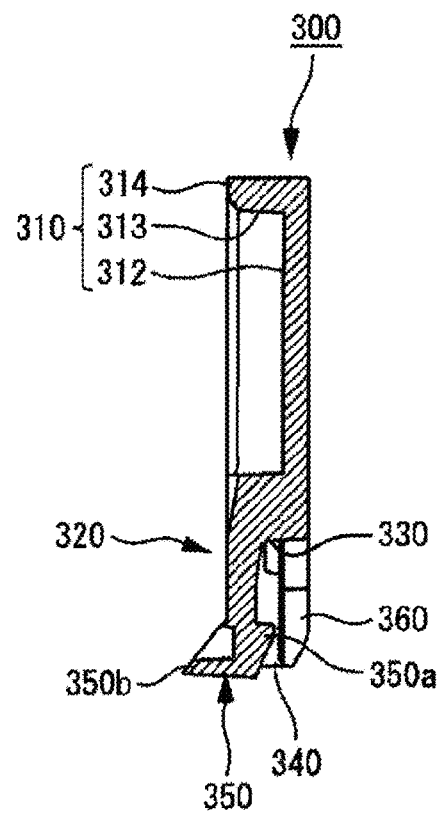
Figure 13A:
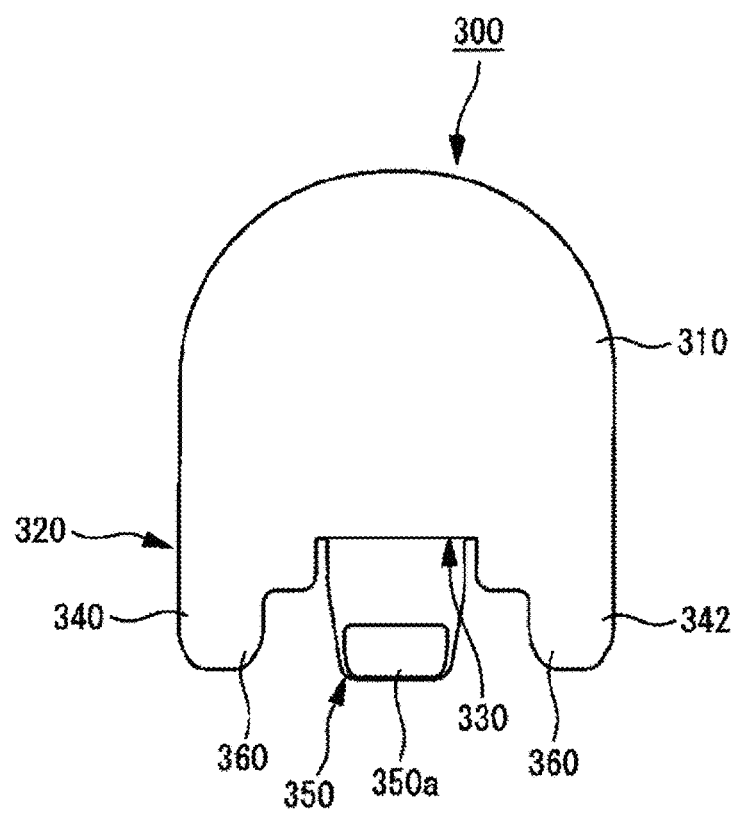
FIG. 13A is a bottom view showing the configuration example of the cap and FIG. 13B is a side view thereof.
Figure 13B:
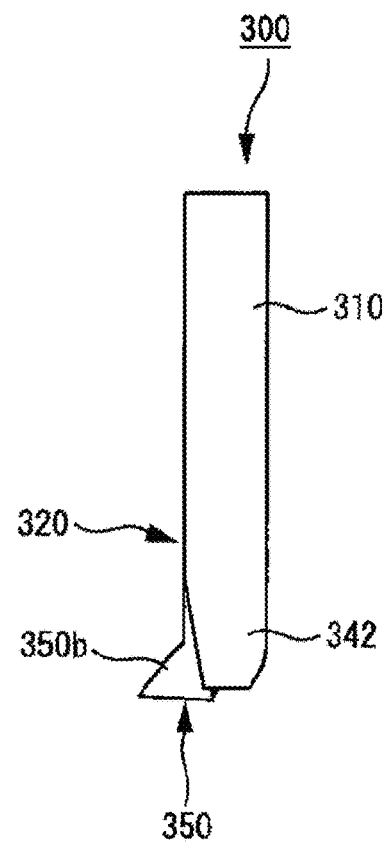

Next, a cap 300 will be described. FIG. 11 is a perspective view showing an example of a configuration of the cap 300 according to one embodiment of the present invention. FIG. 12A is a plan view showing the configuration example of the cap 300 and FIG. 12B is a sectional view taken along a line A-A in the cap 300 as shown in FIG. 12A. FIG. 13A is a bottom view showing the configuration example of the cap 300 and FIG. 13B is a side view thereof. In FIG. 11, a downward direction on the paper surface is referred to as an extracting direction D2 in which the cutting blade 200 is extracted from the cap 300, and a upward direction on the paper surface is referred to as a mounting direction D3 in which the cutting blade 200 is loaded into the cap 300.

As shown in FIGS. 11 to 13, the cap 300 is a member intended to hold the cutting blade 200 in a stable posture during replacing of the cutting blade 200 and also to protect the teeth 230 of the cutting blade 200 (see FIG. 10A). The cap 300 has a grip portion 310 and a cutting blade holding portion (holding portion) 320.

The grip portion 310 has, for example, a flat and generally half-circular shape as viewed in a plan view, namely a generally semi-cylindrical shape and is formed to have an external appearance larger than an average thumb size of general users. The grip portion 310 has a flat surface portion 312 and an edge portion 314 connected to the flat surface portion 312 via a step 313 and formed along a peripheral edge portion of the flat surface portion 312. Therefore, since the edge portion 314 formed by the step 313 serves as a slip stopper, a user can perform an operation of replacing the cutting blade 200 while securely gripping the cap 300.

The cutting blade holding portion 320 is integrally formed with an end portion 317 of the grip portion 310 facing a direction (direction in which the cutting blade 200 is mounted) opposite to an end portion 316 thereof facing a direction in which gripping fingers of the user extend and is configured to hold the teeth of the cutting blade 200 while causing the teeth to face the grip portion 310. The cutting blade holding portion 320 has a blade edge protection portion 330, a side surface guide portion 340, 342, a first support portion (support portion) 350, and a second support portion 360.

The blade edge protection portion 330 is a portion configured to prevent the teeth 230 of the cutting blade 200 from coming in contact with a hand of the user or any parts of the binder main body 40 during replacing of the cutting blade 200. The blade edge protection portion 330 includes a tooth abutting portion 330a and tooth fitting portions 330b. The tooth abutting portion 330a is configured by an end surface provided on the end portion 317 of the grip portion 310 and is configured to allow the teeth 230 of the mounted cutting blade 200 to be abutted thereagainst. A thickness of the end surface portion is configured to be thicker than a blade thickness of the cutting blade 200, so that the teeth 230 of the cutting blade 200 can be protected without being exposed to the outside. The tooth fitting portions 330b are configured to protrude from the end surface of the tooth abutting portion 330a as described above and also to have a convex shape corresponding to the saw-shaped teeth 230 of the cutting blade 200, so that when the cutting blade 200 is mounted on the cap 300, the teeth 230 are engaged (fitted) therebetween.

The side guide portions 340, 342 are respectively provided to extend from widthwise side ends of the end portion 317 of the grip portion 310 by a predetermined length in the extracting direction D2. That is, the side guide portions 340, 342 extend from locations, which correspond to the side surface portion of the cutting blade 200 to be mounted, along the extracting direction D2. A distance Z1 between inner wall surfaces of the side guide portions 340, 342 is set to be substantially the same as the width Y3 of the cutting blade 200. Each of the inner surfaces of the side guide portions 340, 342 is configured by a flat surface and is configured to slidably support the respective side surface portions of the cutting blade 200 when the cutting blade 200 is mounted on or removed from the cap 300. A length Z2 of the side guide portions 340, 342 in a length direction thereof is set, for example, to a length ranging from a distal end of the cutting blade 200 to substantially the middle thereof, so that a posture of the mounted cutting blade 200 can be stabilized.

The first support portion 350 is provided to extend from a portion of the end portion 317 of the grip portion 310, which corresponds to the middle portion thereof in a width direction and also is located on an upper side thereof in a thickness direction, by a predetermined length in the extracting direction D2. That is, the first support portion 350 extends from the end portion 317 of the grip portion 310 toward the cutting blade 200 to be mounted on the cap 300. The first support portion 350 serves as a leaf spring and is configured to elastically support a front surface (first surface) of the cutting blade 200 by a first protrusion 350a provided on an inner side of a distal end thereof. Also, a second protrusion 350b is provided on an outer side of the distal end of the first support portion 350. The second protrusion 350b serves as a positioning portion when the cutting blade 200 is mounted at a mounting location on the binder main body 40, and is provided to be fitted into a recess 59 (see FIG. 15A and the like) serving as an aligning portion provided at a loading location on the binder main body 40 as described below.

The second support portion 360 is provided to extend in the extracting direction D2 from a portion of the end portion 317 of the grip portion 310, which is located on a lower side thereof in the thickness direction, and is configured to support a back surface of the cutting blade 200 mounted on the cap 300. In the present embodiment, the second support portion 360 is formed to have a shape along the tooth abutting portion 330a and the side guide portions 340, 342.

Configuration Example of Cap Unit 400

Figure 14A:
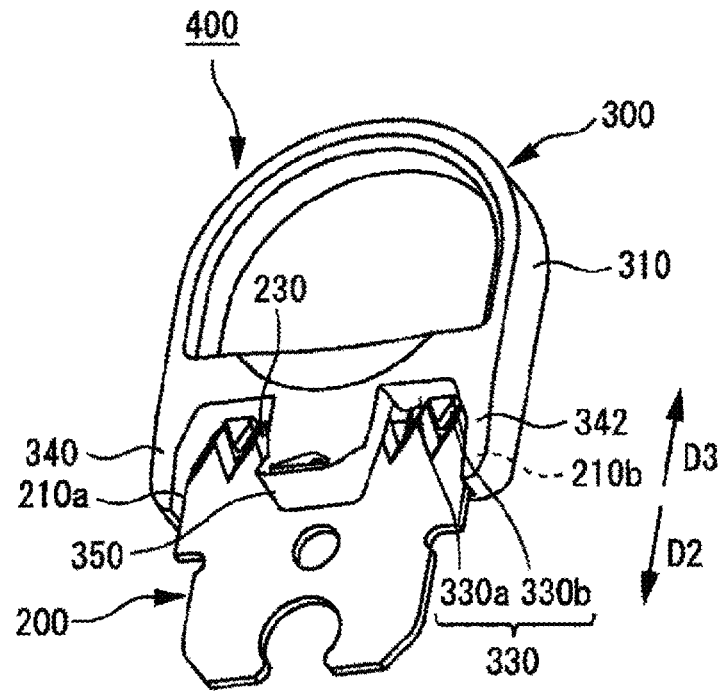
FIG. 14A is a perspective view showing a configuration example of a cap unit and FIG. 14B is a plan view thereof.
Figure 14B:
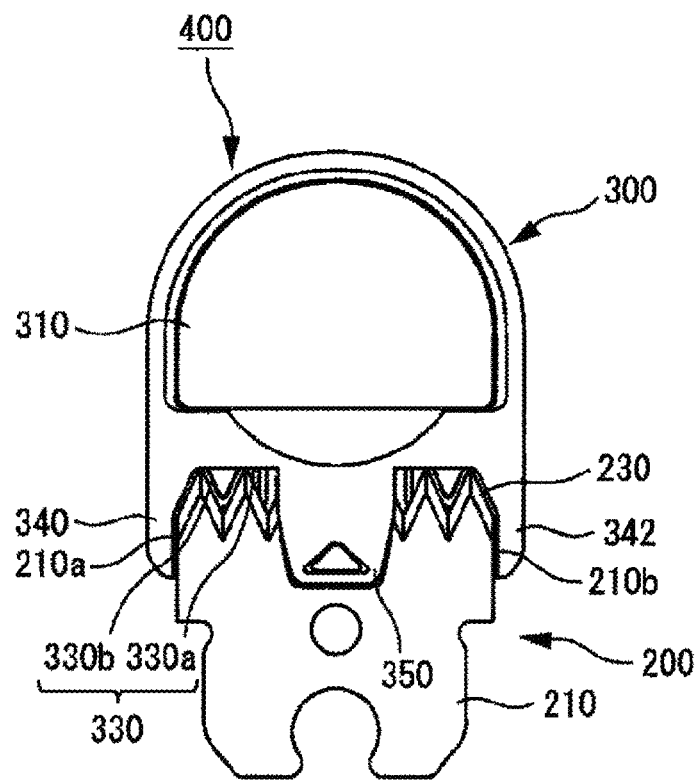

Next, a cap unit 400 will be described. FIG. 14A is a perspective view showing an example of a configuration of the cap unit 400 and FIG. 14B is a plan view thereof. As shown in FIGS. 14A and 14B, the cap unit 400 is constituted of the cap 300 and the cutting blade 200 mounted on the cap 300.

The teeth 230 of the cutting blade 200 are protected while being engaged with the tooth fitting portions 330b of the cap 300 and also being abutted against the tooth abutting portion 330a. Also, the front and back surfaces of the cutting blade 200 are sandwiched and supported by the first support portion 350 and the second support portion 360. The side surface portions 210a, 210b of the cutting blade 200 are respectively supported by the side guide portions 340, 342. Therefore, when the cutting blade 200 is mounted on the cap 300, movement of the cutting blade 200 in the upward and downward direction and also the width direction can be restricted, and as a result, the cutting blade 200 can be held in a stable posture by the cap 300.

Example of Operation of Replacing Cutting Blade 200

Figure 15A:
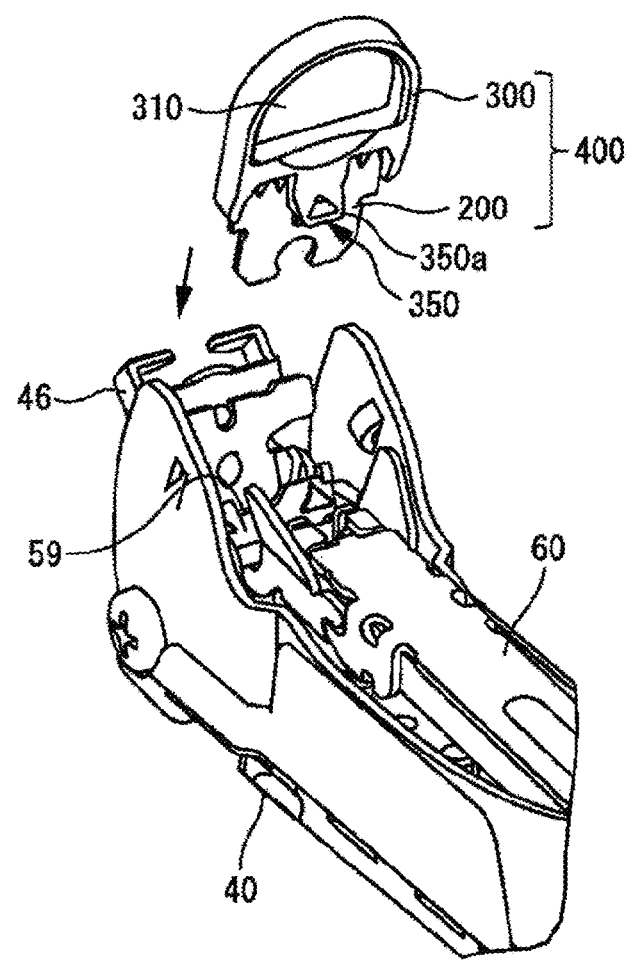
FIG. 15A is a perspective view explaining a state before the cutting blade is loaded in a binder main body.
Figure 15B:
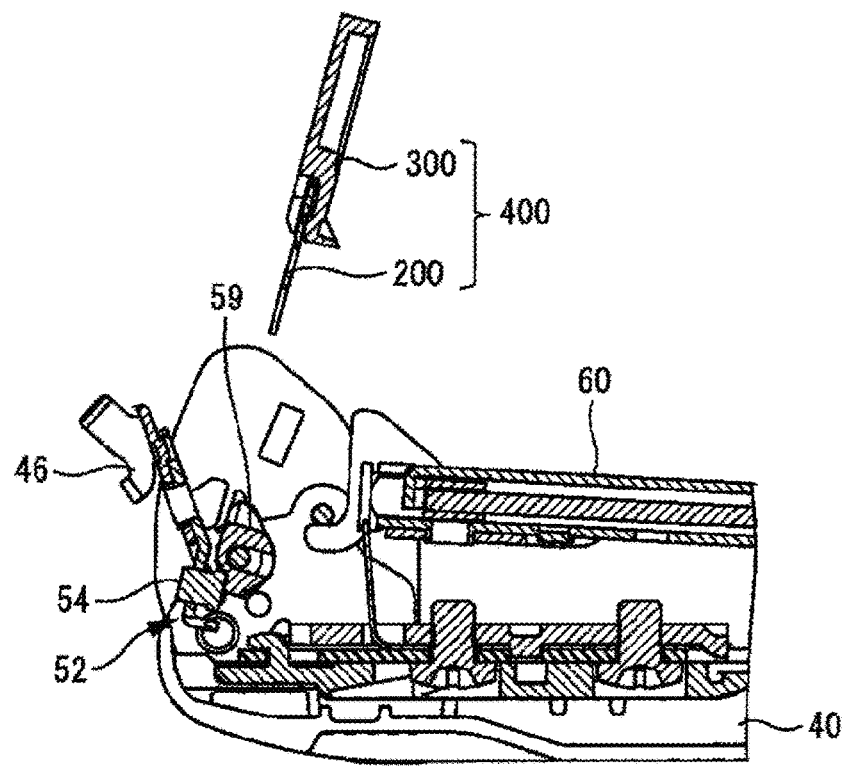
FIG. 15B is a sectional view thereof.
Figure 16A:
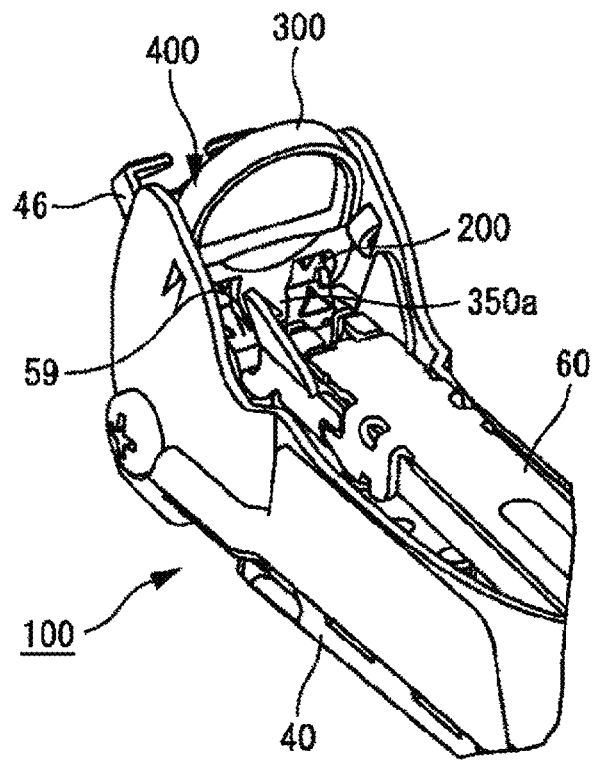
FIG. 16A is a perspective view explaining a state when the cutting blade is loaded in a loading location on the binding machine for gardening.
Figure 16B:
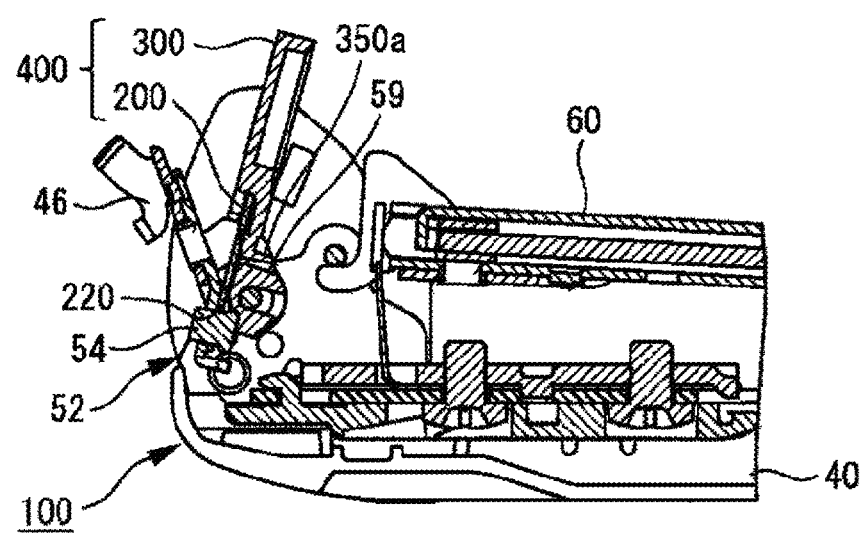
FIG. 16B is a sectional view thereof.
Figure 17A:
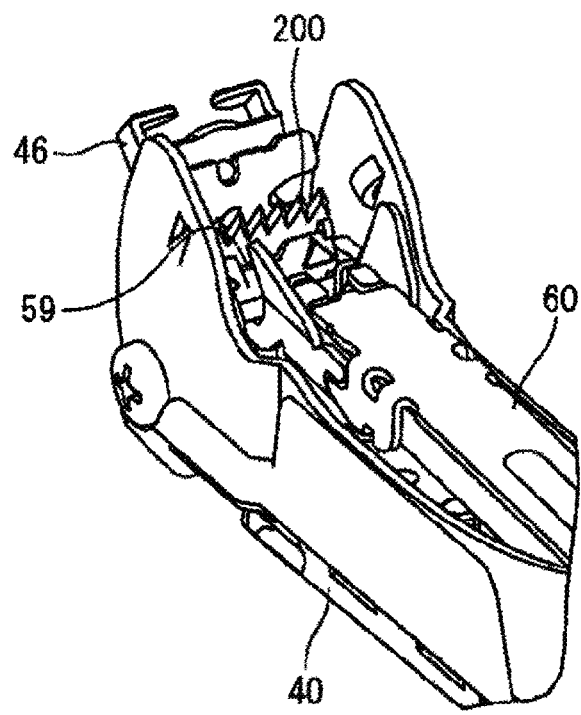
FIG. 17A is a perspective view explaining a state after the cutting blade is loaded in the loading location on the binding machine for gardening.

Next, replacing the cutting blade 200 will be described. FIG. 15A is a perspective view explaining a state before the cutting blade 200 is loaded in the binder main body 40, and FIG. 15B is a sectional view thereof. FIG. 16A is a perspective view explaining a state when the cutting blade 200 is loaded in a loading location on the binding machine for gardening 100, and FIG. 16B is a sectional view thereof. FIG. 17A is a perspective view explaining a state after the cutting blade 200 is loaded in the loading location on the binding machine for gardening 100, and FIG. 17B is a sectional view thereof.

As shown in FIGS. 15A and 15B, a user prepares the cap unit 400 and then grips the grip portion 310 of the cap 300 with a thumb and an index finger of one hand. Subsequently, the user pivots and opens the tape guide 46 outward while pushing the release button 54 of the lock mechanism 52 with the other hand.

Then, as shown in FIGS. 16A and 16B, the user moves the gripped cap unit 400 toward the binding machine for gardening 100 while causing the recess 220 of the cutting blade 200 (see FIG. 10A) to face the binding machine for gardening 100, thereby fitting the first protrusion 350a of the first support portion 350 of the cap 300 into the recess 59 provided on the binding machine for gardening 100. Accordingly, the recess 220 of the cutting blade 200 is fitted onto the release button 54 of the lock mechanism 52. Subsequently, the user releases the other hand from the release button 54, and as a result, the cutting blade 200 is locked by the lock mechanism 52.

Figure 17B:
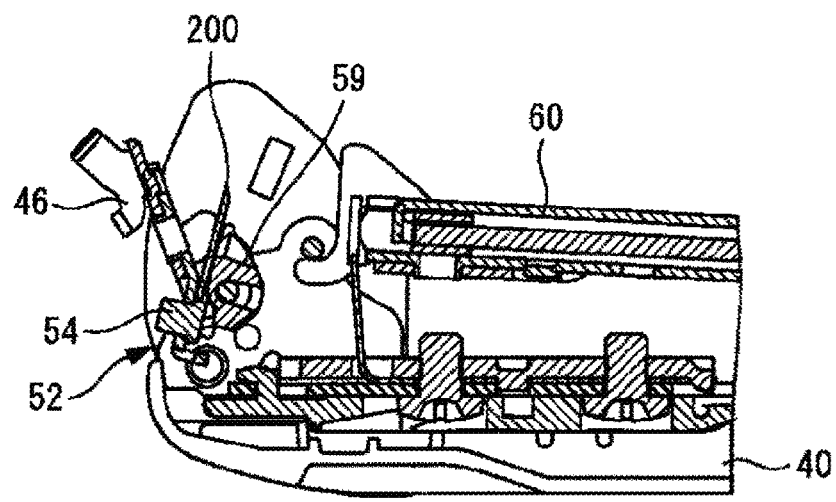
FIG. 17B is a sectional view thereof.

Then, as shown in FIGS. 17A and 17B, the user pulls outward the cap 300 gripped with the one hand, thereby removing the cap 300 from the cutting blade 200. In the present embodiment, an operation of replacing the cutting blade 200 is performed by such a series of steps.

Operation Example of Lock Mechanism 52

Figure 18A:
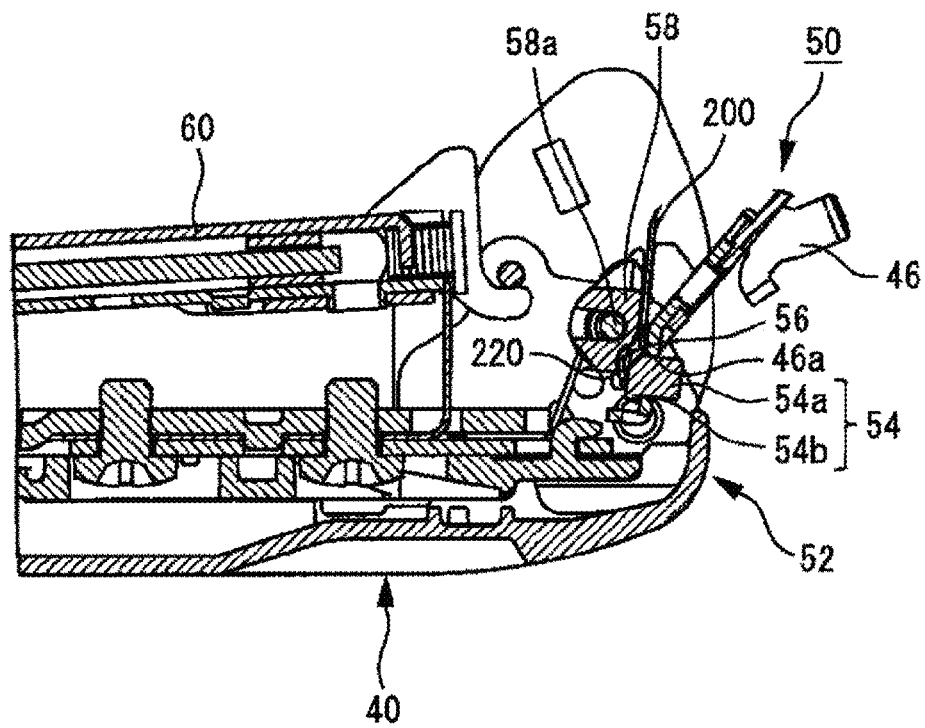
FIGS. 18A and 18B are views showing operation examples of a lock mechanism depending on whether or not the release button is pushed.
Figure 18B:
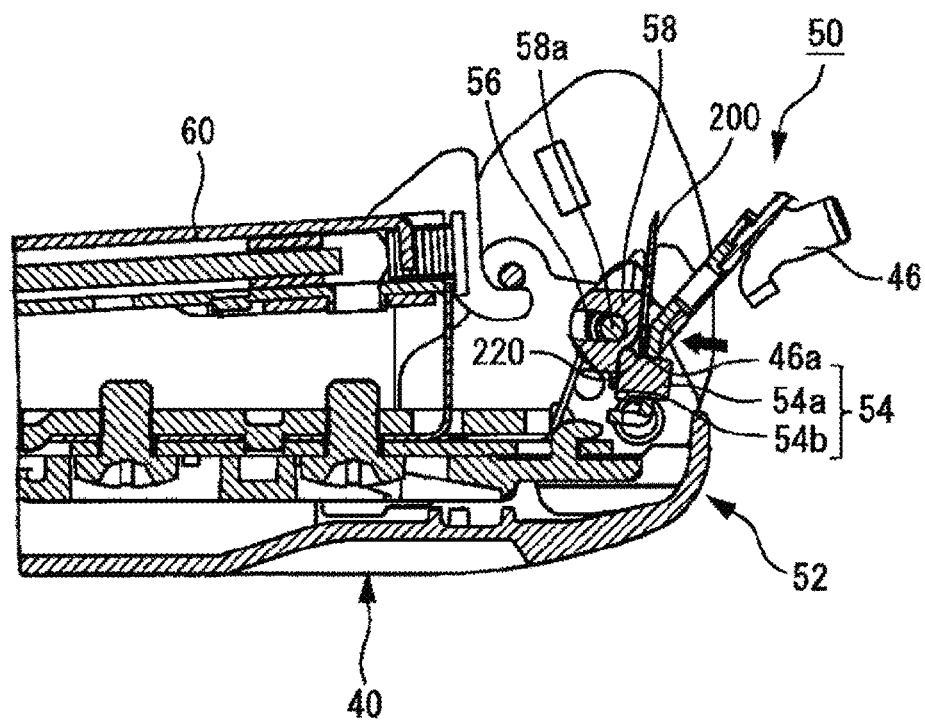
Figure 19A:
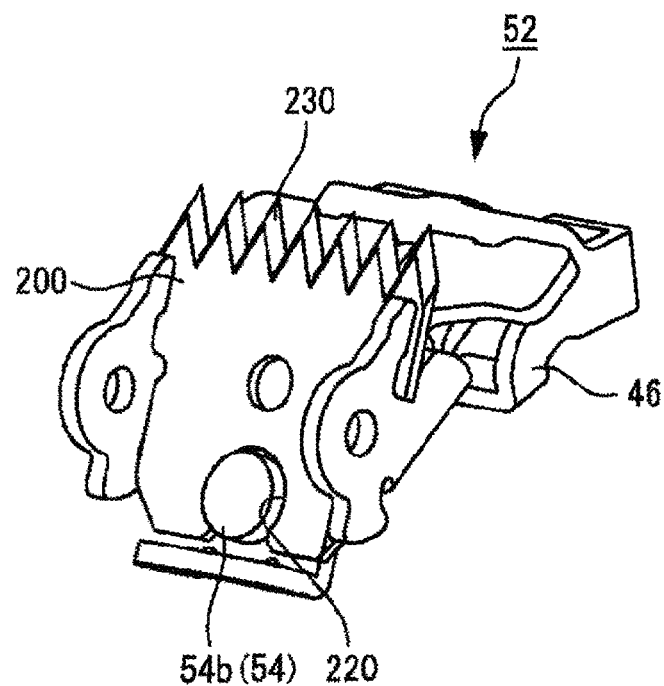
FIGS. 19A and 19B are views showing an operation example of the lock mechanism when the release button is not pushed.
Figure 19B:
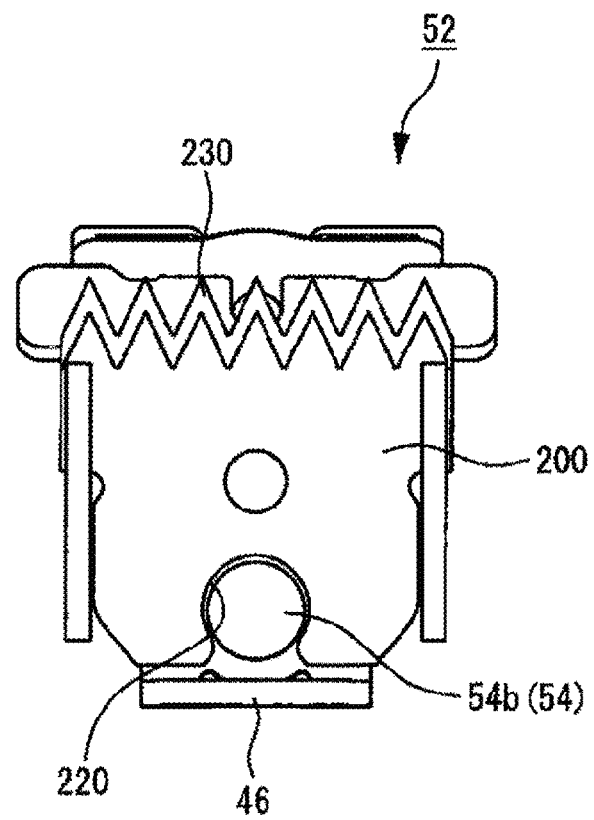
Figure 20A:
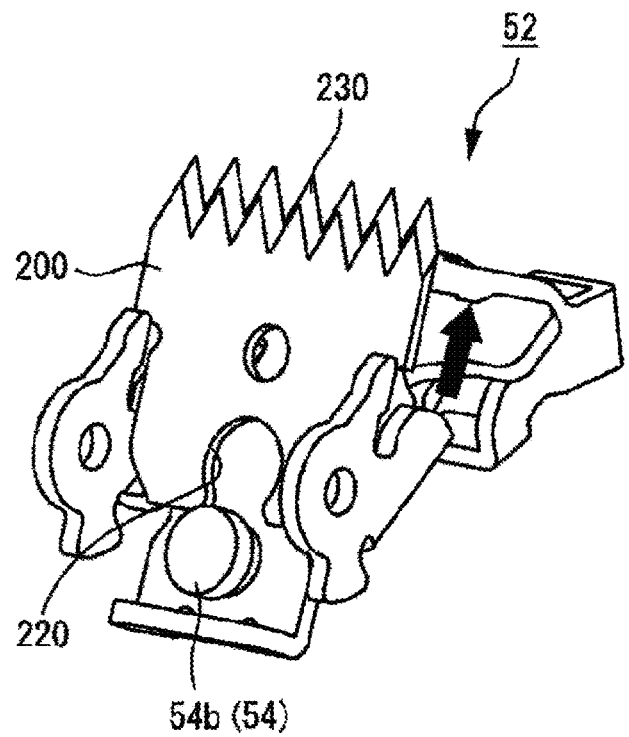
FIGS. 20A and 20B are views showing an operation example of the lock mechanism when the release button is pushed.

Next, an example of an operation of the lock mechanism 52 when locking and unlocking the cutting blade 200 with respect to the binder main body 40 will be described. FIG. 18A is a perspective view showing a state of the lock mechanism 52 when the release button 54 is not pushed and FIG. 18B is a perspective view showing a state of the lock mechanism 52 when the release button 54 is pushed. FIG. 19A is a perspective view showing the state when the release button 54 is not pushed, as viewed from the rear side of the lock mechanism 52, and FIG. 19B is a plan view thereof. FIG. 20A is a perspective view showing a state when the cutting blade 200 is unlocked and removed, as viewed from the rear side of the lock mechanism 52, and FIG. 20B is a plan view thereof.

As shown in FIGS. 18A, 19A and 19B, in a state where the release button 54 is not pushed, the enlarged diameter portion 54b of the release button 54 is positioned in the recess 220 of the cutting blade 200, and thus the recess 220 of the cutting blade 200 is caught (locked) on the enlarged diameter portion 54b of the release button 54. Therefore, the cutting blade 200 is locked at an optimal location in the tape guide 46.

Figure 20B:
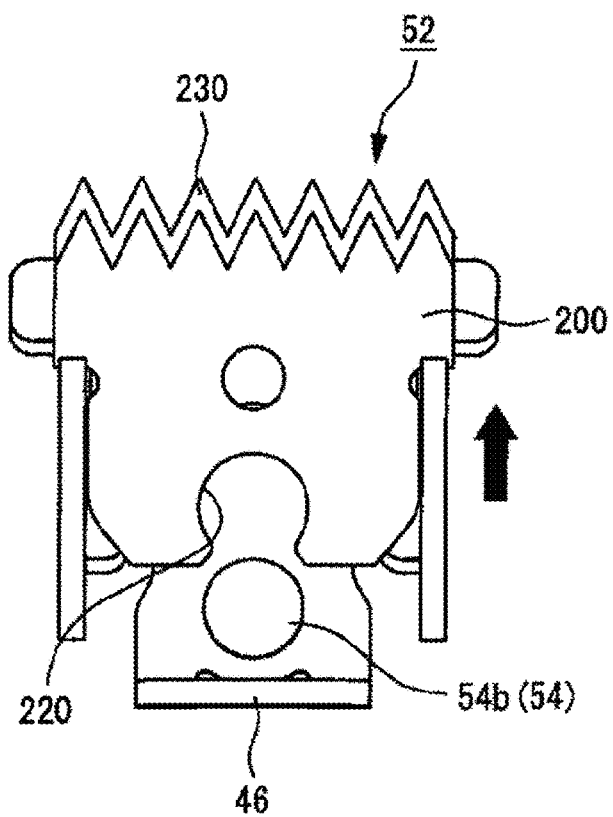

As shown in FIGS. 18B, 20A and 20B, if the release button 54 is pushed by the user, the release button 54 is moved rearward against an urging force of the coil spring 56. Therefore, the cylindrical body 54a of the release button 54, which has the diameter X1 smaller than the width Y2 of the recess 220 of the cutting blade 200, is positioned in the recess 220, and thus locking of the cutting blade 200 by the release button 54 is released. In this state, if the cutting blade 200 is pulled outward, the recess 220 of the cutting blade 200 can escape from the release button 54, and as a result, the cutting blade 200 can be removed from the binder main body 40.

As described above, according to the present embodiment, during replacing of the cutting blade 200, the cutting blade 200 is held by the cap 300 and thus a posture of the cutting blade 200 can be stabilized. That is, in the related art, the cutting blade 200 is gripped with a needle nose pliers or the like and thus the cutting blade 200 is likely to be misaligned with the respect to the needle nose pliers. However, the problem of misalignment can be solved by using the cap 300. Therefore, it is possible to precisely load the cutting blade 200 at a loading location on the binder main body 40.

Also, according to the present embodiment, the teeth 230 on the distal end of the cutting blade 200 are protected by the cap 300. Therefore, it is possible to prevent the teeth 230 of the cutting blade 200 from coming in contact with any parts constituting the binding machine for gardening 100 or a hand of a user during replacing of the cutting blade 200.

Further, according to the present embodiment, the cutting blade 200 can be held at a fixed position (in an immovable state) by the cap 300 and thus can be strongly pushed into the loading location on the binder main body 40. Therefore, it is possible to facilitate loading the cutting blade 200 into the loading location on the binder main body 40. As a result, the cutting blade 200 can be loaded into the loading without damaging the teeth 230.

Further, according to the present embodiment, the cap 300 is removed after the cutting blade 200 is loaded in the loading location on the binder main body 40. However, if the cutting blade 200 is reliably loaded to reach the loading location, the lock mechanism 52 is activated. Therefore, the cutting blade 200 is not removed from the binder main body 40, but the cap 300 only is removed. In contrast, if the cutting blade 200 is not loaded to the extent that the cutting blade 200 reaches the loading location, the cutting blade 200 is also removed together with the cap 300. Therefore, it is possible to identify whether or not the cutting blade 200 is precisely loaded in the loading location, depending on whether or not the cutting blade 200 is mounted on the removed cap 300.

Meanwhile, although the present invention has been described with reference to the foregoing embodiments, the technical scope of the invention is not limited to the scope as described in the foregoing embodiments. Various modifications or improvements may be added to the foregoing embodiments without departing from the spirit of the invention.

59 Recess (aligning portion)
200 Cutting blade
230 Tooth
300 Cap
310 Grip portion
320 Cutting blade holding portion (holding portion)
330 Blade edge protection portion
340, 342 Side guide portion
350 First support portion (support portion)
350b Second protrusion (positioning portion)
400 Cap unit
TP Tape

The invention claimed is:

1. A cap which is configured to be removably attached to a cutting blade which cuts a tape, the cap comprising:
a grip portion to be gripped by a user; and
a holding portion configured to hold teeth provided on a cutting edge at a distal end of the cutting blade with the teeth of the cutting blade facing the grip portion;
wherein the holding portion comprises a protection portion including an end surface against which the teeth of the cutting blade are abutted when the cutting blade is in a loaded position in the cap, and
wherein the holding portion comprises a pair of side guide portions which are located on one end side of the grip portion and respectively correspond to side surface portions of the cutting blade, and the pair of side guide portions are configured to guide the side surface portions of the cutting blade when the cutting blade is mounted or removed.

2. The cap according to claim 1, wherein the holding portion comprises a first support portion extending from a location on the one end side of the grip portion and between the pair of side guide portions, and the first support portion is configured to support a first surface of the cutting blade.

3. The cap according to claim 2, wherein the first support portion further includes a positioning portion configured to be fitted into an aligning portion provided at a loading location on a binding machine for gardening upon loading of the cutting blade into the binding machine for gardening.

4. The cap according to claim 2, wherein the holding portion comprises a second support portion extending from a location on the one end side of the grip portion and between the guide portions and configured to support a second surface of the cutting blade, and the second surface is on an opposite side of the cutting blade with respect to the first surface.

5. The cap according to claim 1, comprising a positioning portion that is configured to align the cap and an aligning portion provided at a loading location on a binding machine for gardening, the positioning portion including a protrusion which protrudes in a direction away from the cutting blade when the cutting blade is in a loaded position in the cap.

6. The cap according to claim 1, wherein a thickness of the end surface of the protection portion is configured to be thicker than a thickness of the cutting blade.

7. The cap according to claim 1, wherein each of inner surfaces of the pair of side guide portions includes a flat surface and is configured to slidably support the respective side surface portions of the cutting blade when the cutting blade is mounted on or removed from the cap.

8. The cap according to claim 1, wherein a length of each of the side guide portions is set to the distance between the distal end and substantially the middle of the cutting blade.

9. The cap according to claim 1, wherein the grip portion includes a flat surface portion and a step extending around a perimeter of the flat surface portion;
the cap further including a first support portion located between the pair of side guide portions and which is configured to elastically urge against a first surface of the cutting blade at a location between the side surface portions of the cutting blade.

10. The cap according to claim 1, wherein the cap is configured to receive the cutting blade in a mounting direction in which the teeth of the cutting blade are on a leading side of the blade with respect to the mounting direction and the side surface portions of the cutting blade are slidably guided by the pair of side guide portions; and
wherein the cap is configured such that in a loaded position of the blade in the cap, the teeth of the cutting blade are received in the cap and a mounting portion of the cutting blade at which the cutting blade is attached to a binding machine for gardening is exposed outside of the cap.

11. The cap according to claim 10,
the cap further including a first support portion located between the pair of side guide portions and which is configured to elastically urge against a first surface of the cutting blade at a location between the side surface portions of the cutting blade.

12. A cap unit, comprising:
a cutting blade configured to cut a tape, the cutting blade including a cutting edge on a distal end thereof; and
a cap removably attachable to the cutting blade, wherein the cap comprises:
a grip portion to be gripped by a user; and
a holding portion configured to hold the cutting edge provided on the distal end of the cutting blade with the cutting edge facing a direction toward the grip portion;
wherein the holding portion includes a protection portion which receives the cutting edge with the cutting edge facing in the direction toward the grip portion,
wherein the blade includes a recess on an end opposite to the distal end at which the cutting edge is located,
the cap unit including a mounting direction in which the blade is loaded into the cap and an extracting direction in which the cutting blade is removed from the cap, and wherein the blade is moved from an unloaded position to a loaded position in the mounting direction with the cutting edge at a leading end of the cutting blade, and
in the loaded position in which the cutting blade is loaded into the cap, the recess of the cutting blade is exposed outside of the cap.

13. The cap unit according to claim 12, wherein the cutting edge of the cutting blade includes a plurality of teeth, and wherein the teeth abut against the protection portion in the loaded position.

14. The cap unit according to claim 13, wherein the protection portion includes tooth abutting portions and tooth fitting portions, with the tooth fitting portions protruding from the tooth abutting portions, and wherein when the cutting blade is in the loaded position the teeth of the cutting blade fit between the tooth fitting portions of the cap.

15. The cap unit according to claim 12, wherein the cutting blade includes a pair of side surface portions extending between the distal end and the end opposite to the distal end; and the cap includes a pair of side guide portions which slidably support the side surface portions of the cutting blade.

16. The cap unit according to claim 15, wherein the cap further includes a first support portion which elastically urges against a first surface of the cutting blade at a location between the pair of side surface portions.

17. The cap unit according to claim 12, wherein the grip portion of the cap includes a flat surface portion and a step extending around a perimeter of the flat surface portion.

\* \* \* \* \*

UNITED STATES PATENT AND TRADEMARK OFFICE
CERTIFICATE OF CORRECTION

PATENT NO. : 10,787,282 B2  
APPLICATION NO. : 15/726465  
DATED : September 29, 2020  
INVENTOR(S) : Hajime Takemura Page 1 of 1

It is certified that error appears in the above-identified patent and that said Letters Patent is hereby corrected as shown below:

On the Title Page

Under FOREIGN PATENT DOCUMENTS, the first reference listed "CN 201742766" should read -- CN 201742755 --.

Signed and Sealed this  
Eighth Day of December, 2020

Andrei Iancu  
*Director of the United States Patent and Trademark Office*